United States Patent [19]

Porter, Jr. et al.

[11] 4,410,667
[45] Oct. 18, 1983

[54] ELASTOMERIC COATING COMPOSITIONS

[75] Inventors: Samuel Porter, Jr., Natrona Heights; Robert M. Piccirilli, Pittsburgh; Wen-Hsuan Chang; James B. O'Dwyer, both of Gibsonia, all of Pa.; Kyu-Wang Lee, Danville, Calif.

[73] Assignee: PPG Industries, Inc., Pittsburgh, Pa.

[21] Appl. No.: 343,784

[22] Filed: Jan. 29, 1982

[51] Int. Cl.$^3$ ............ C08L 67/02; C08L 75/04; C08L 61/24; C08L 61/28

[52] U.S. Cl. ............ 525/440; 525/443; 525/454; 525/456; 525/457

[58] Field of Search .......... 525/454, 456, 457, 440, 525/443

[56] References Cited

U.S. PATENT DOCUMENTS

| | | | |
|---|---|---|---|
| 2,720,500 | 10/1955 | Cody | 260/47 |
| 2,734,876 | 2/1956 | Bradley | 260/16 |
| 2,967,840 | 1/1961 | Phillips et al. | 260/22 |
| 3,464,938 | 9/1969 | Nordstrom | 260/21 |
| 3,477,976 | 11/1969 | Nakamuro et al. | 260/22 |
| 3,535,287 | 10/1970 | Wynstra | 260/75 |
| 3,624,232 | 11/1971 | Van Dorp et al. | 117/21 |
| 3,668,275 | 6/1972 | Riemhofer et al. | 260/850 |
| 3,668,276 | 6/1972 | Riemhofer et al. | 260/850 |
| 3,668,277 | 6/1972 | Riemhofer et al. | 260/850 |
| 3,678,128 | 7/1972 | Riemhofer et al. | 260/850 |
| 3,691,258 | 9/1972 | Riemhofer et al. | 260/850 |
| 3,819,757 | 6/1974 | Dorffel et al. | 260/850 |
| 3,852,375 | 12/1974 | Blethan et al. | 260/850 |
| 3,907,736 | 9/1975 | Barton et al. | 260/29.4 R |
| 3,912,790 | 10/1975 | Chang et al. | 260/849 |
| 3,928,265 | 12/1975 | Dhein et al. | 260/21 |
| 3,957,709 | 5/1976 | Holzrichter et al. | 260/29.4 R |
| 3,962,522 | 6/1976 | Chang et al. | 428/423 |
| 3,994,851 | 11/1976 | Chang | 260/29.4 R |
| 4,025,474 | 5/1977 | Porter, Jr. et al. | 260/22 CO |
| 4,054,614 | 10/1977 | Hoffmann | 260/850 |
| 4,088,619 | 5/1978 | Holzrichter | 260/29.4 R |
| 4,093,675 | 6/1978 | Schure et al. | 260/835 |
| 4,101,603 | 7/1978 | Smith et al. | 260/850 |
| 4,104,240 | 8/1978 | Buter | 260/39 P |
| 4,113,793 | 9/1978 | Sekmakas | 260/850 |
| 4,125,570 | 11/1978 | Chang et al. | 525/456 |
| 4,154,891 | 5/1979 | Porter, Jr. et al. | 428/334 |
| 4,158,652 | 6/1979 | Koleske et al. | 260/29.4 UA |
| 4,204,014 | 5/1980 | Dorffel et al. | 427/385.5 |

*Primary Examiner*—Allan Lieberman
*Attorney, Agent, or Firm*—William J. Uhl

[57] ABSTRACT

Thermosetting elastomeric coating compositions are disclosed. The resinous binder of the coating compositions is based on a hard polyester polyol containing cyclic moieties plasticized with a blend of soft polyurethane polyols, one of which has a high molecular weight and one of which has a low molecular weight, and cured with a curing agent capable of reacting with active hydrogens, for example, an aminoplast curing agent. The coating compositions are resistant to solvent popping and are particularly useful on elastomeric substrates such as high density polyurethane foams, as well as on metal substrates such as steel and aluminum.

11 Claims, No Drawings

ELASTOMERIC COATING COMPOSITIONS

BACKGROUND OF THE INVENTION

1. Field of the Invention

The invention relates to thermosetting resinous coating compositions, particularly to elastomeric coating compositions.

2. Brief Description of the Prior Art

Elastomeric coating compositions are those which have excellent flexibility, particularly at low temperature, along with good hardness and durability. Such coating compositions are particularly useful on elastomeric parts of automobiles and trucks such as bumpers, front end hood sections and the side moldings.

Examples of elastomeric coating compositions are shown in U.S. Pat. No. 3,962,522. These coating compositions are based on polyesterurethane polyols cured with aminoplast. Another example of an elastomeric coating composition is that disclosed in U.S. Pat. No. 4,154,891. These coating compositions are based on polymeric polyols such as soft polyurethane polyols cured with a stoichiometric excess of an aminoplast curing agent.

The coating compositions of the aforementioned prior art are not sprayable at high resin solids content. This is a disadvantage in that multiple coating applications are required to get the desired coating thickness and appearance. The coating compositions of the present invention, although requiring multiple coatings, do not require as many as with the aforementioned prior art coating compositions. Also, future air pollution standards will require a reduction of organic solvent emissions of today's organic solvent-based coating compositions. Therefore, the coating compositions described in the aforementioned prior art may not be environmentally acceptable in the future.

Also, the coating compositions of the present invention are resistant to "solvent popping". Elastomeric coatings are typically applied in multiple coats with a solvent flashing step between coats. If the coatings are applied at too heavy a deposit, insufficient solvent will be removed in the flashing step. This results in excess solvent being entrained in the uncured coating. Although the solvent will be released during the curing step, the surface of the coating is undergoing a crosslinking reaction and the solvent must "burst" through the crosslinking film surface. This results in a permanent hole in the surface of the coating and the phenomena is referred to as "solvent popping". The coating compositions of the present invention have less of a tendency to solvent pop than coating compositions in the aforementioned prior art.

U.K. Pat. No. 1,477,008 discloses coating compositions comprising thermosetting resins, for example, hard polyester polyols, soft polyurethane polyols and aminoplast curing agents. These coating compositions, however, do not have the elastomeric properties of the coating compositions of the present invention.

CROSS REFERENCE TO RELATED APPLICATIONS

Application Ser. No. 343,785, filed even date therewith, relates to thermosetting coating compositions sprayable at high resin solids contents. The resinous binder of the coating compositions is based on a hard polyester polyol containing cyclic moieties plasticized with a soft polyurethane polyol and cured with a curing agent suh as an aminoplast.

Application Ser. No. 344,082, filed even date herewith, relates to thermosetting elastomeric coating compositions. The resinous binder of the coating compositions is based on a hard polyester polyol containing cycloaliphatic moieties plasticized with a soft polyurethane polyol and cured with a curing agent such as an aminoplast.

SUMMARY OF THE INVENTION

In accordance with the present invention, a thermosetting, liquid, elastomeric, film-forming composition is provided. The film-forming composition is sprayable at a resin solids content of at least 35 percent by weight and is flexible such that when the coating composition is deposited on an elastomeric substrate and cured, the coated elastomeric substrate can be bent around a ¼-inch mandrel with the coating facing outwardly and the coating exhibits no breaks or cracks when tested at 0° F. The film-forming constituents of the coating composition comprise:

(A) a polyester polyol having at least 20 percent by weight cyclic moieties, having a hydroxyl value of at least 80, the cyclic content of the polyester and the hydroxyl value being not greater than that required to achieve the above-mentioned flexibility at 0° F.; the polyester having a molecular weight of 300 or greater but not greater than that required for formulating the coating composition with a sprayability of at least 35 percent by weight, and a Sward Hardness value of at least 15, (B) a polyurethane polyol having a molecular weight of 8000 or less but not less than that required to achieve the above-mentioned flexibility at 0° F., and a Sward Hardness value of less than 10, (C) a polyurethane polyol having a molecular weight of at least 12,000 but not greater than that required for formulating the coating composition with a sprayability of at least 35 percent by weight, and a Sward Hardness value of less than 10, and (D) a curing agent capable of reacting with the active hydrogens in (A), (B) and (C) to form a crosslinked coating selected from the class consisting of aminoplast and polyisocyanates;

the difference in Sward Hardness values between (A) and (B) and (A) and (C) each being greater than 10; the weight ratio of (A)+(B)+(C):(D) is within the range of 5 to 0.5:1; the weight ratio of (A)+(D):(B)+(C) is within the range of 100 to 1:1 and the weight ratio of (B):(C) is within the range of 4 to 0.5:1.

DETAILED DESCRIPTION

The coating compositions of the present invention are characterized as being thermosetting, liquid and elastomeric in nature. By "thermosetting" is meant the coating composition, upon heating, will solidify or set to form a coating which will not remelt on further heating.

By "liquid" is meant the composition is free flowing and not a solid or a gas.

The elastomeric behavior of the coating compositions of the present invention can be determined by measuring the tensile strength, elongation and flexibility of the coating, particularly the low temperature flexibility of the coating over an elastomeric substrate. The tensile strength and percent elongation of the coatings is determined according to ASTM D-639-72 on free films of the cured resinous ingredients. Accordingly, coatings deposited from the resinous components of the present invention have tensile strengths within the range of 2000 to 10,000 psi, elongations of at least 40, and most preferably from 75 to 200 percent.

The flexibility of the coatings can be determined by coating an elastomeric substrate such as ⅛ inch thick thermoplastic polyurethane commercially available from Mobay Company as TEXIN 3202 and bending the coated substrate around a ¼ inch diameter (1.13 cm) mandrel with the coating side outwardly facing. After bending, the coating is examined for breaks and cracks. Testing can be conducted at room temperature, i.e., 70°–75° F., or at low temperature, i.e., cooling substrate to 0° F. or even −20° F., before bending. When formulated for automotive use on elastomeric parts, the coatings of the present invention exhibit no breaks or cracks when tested at 32° F. and 0° F. in the above-described manner, and preferably exhibit no breaks or cracks when tested at −20° F.

The hardness of the coating can be determined by the Sward method using a Sward rocker as described in ORGANIC COATINGS TECHNOLOGY, Payne, Vol. 1, 1965, pages 642–643. Cured coatings of the present invention usually have a Sward hardness within the range of 4 to 40, preferably 10 to 40, and more preferably 15 to 40.

For outdoor use of such elastomeric coatings for automobiles, the exterior durability of the coatings is important. The durability of the coating can be determined by exposing the coated substrates in Florida. The gloss of the substrate is measured immediately prior to testing and then after 3 months, 6 months and 9 months exposure. Accordingly, with coating compositions of the present invention properly formulated for outdoor exposure with U.V. light stabilizers, anti-oxidants, etc., the loss of gloss should be no more than about 10 percent of the initial value after exposure for 3 months, no more than 20 percent after 6 months, and no more than 60 percent after 9 months.

The hydrolytic stability can also be determined by measuring the humidity resistance of the coating. Humidity resistance of the coating can be determined by using a coated metal substrate as the ceiling of a humidity chamber (QCT chamber) with the coating directed inwardly towards the chamber. The chamber is heated to 100° F. (38° C.) and about a 2 inch (9 cm) level of water is located 3 to 5 inches below the coated panel (panel sloped). The coatings of the present invention, after being subjected to these conditions for 240 hours, show no blistering nor loss of gloss.

The coating compositions of the present invention can be formulated over a wide range of solids content. Preferably, they are formulated as coatings of the high solids type. By high solids is meant the coating composition is sprayable at a resin solids content of at least 35 percent, preferably at least 37 percent, and usually within the range of 37 to 60 percent by weight.

The sprayability is the maximum concentration of the resin solids in solution such that the resin can be atomized sufficiently to form a uniformly deposited coating. Above the maximum concentration, the spraying solution strings and gives a web-like spray pattern. The sprayability of the resin solids is determined by first dissolving the resin in a suitable solvent such as N-methyl pyrrolidone to a viscosity of about 500 to 1000 centipoises measured at 78° F. and then thinning with a mixture of 2 parts methyl ethyl ketone, 2 parts of n-butanol and 1 part of 2-ethoxyethylacetate (all parts by volume) to the maximum spray solids. The sprayability is then determined on the thinned solutions using a spray gun such as an air suction spray gun operating at 60 psi with a No. 30 air cap.

As mentioned above, the coating compositions of the present invention comprise 4 principal resinous components: a polyester polyol, two polyurethane polyols and a curing agent.

The polyester polyol component of the coating composition contains at least 10 percent, preferably at least 20 percent, more preferably at least 25 percent, and most preferably from 25 to 40 percent by weight cyclic moieties. The percentage by weight of cyclic moieties is determined by taking the weight of the ingredients which contain cyclic moieties used in preparing the polyester divided by the total weight of reactive ingredients. Cyclic moieties contribute hardness and durability to the cured coatings. Polyesters containing less than 10 percent by weight cyclic moieties are undesirable because the coatings will have insufficient hardness and durability for elastomeric use. The upper limit of cyclic moieties is preferably less than 70 percent. Polyesters containing greater than 70 percent by weight cyclic moieties are not preferred because of insufficient flexibility in the resultant coating. Preferably, the cyclic moieties are cycloaliphatic because they give a better combination of flexibility and hardness than other cyclic moieties such as aromatic moieties.

The hydroxyl value of the polyester polyol should be at least 80, preferably at least 120, and more preferably at least 200. The hydroxyl value is based on resin solids and determined according to ASTM E-222-76, Method B (reflux 1 hour). The high hydroxyl value of the polyester polyol is important because it contributes to hardness and toughness of the cured film. Also, high hydroxyl values are necessary to formulate high solids compositions. Hydroxyl values less than 80 are undesirable because of the difficulty in formulating high solids compositions. The upper limit of the hydroxyl value is preferably less than 350. Polyesters having hydroxyl values greater than 350 are not preferred because of poor flexibility in the resultant coating.

The polyester polyol used in the practice of the present invention should have a Sward Hardness value greater than 15, usually 15 to 50, preferably 20 to 40.

The Sward Hardness value is a measure of hardness; the higher the value, the harder the polyol as determined with a cured film of the polyol. The Sward Hardness value is the Sward Hardness of a cured film of the polyol. The cured film has a thickness of 3 mils±0.5 mils. The polyol is cured by the following method: The polyol on which the hardness is to be measured is mixed with 160 grams of hexakis(methoxymethyl)melamine per 1 gram equivalent of polyol and 0.5 percent by weight based on total solids of para-toluenesulfonic acid. The mixture is drawn down over a steel substrate with a draw bar (i.e., 6 mil draw bar), and cured at 300° F. (149° C.) for 30 minutes. The Sward Hardness of the cured film is determined and reported as the Sward Hardness value of the polyol.

Polyesters with Sward Hardness values less than 15 are undesirable because the resultant cured coating will have insufficient durability and hardness. Polyesters having Sward Hardness values greater than 50 are less preferred because the resultant coatings will have less than optimum flexibility at low temperature.

The polyester polyol is prepared by polyesterification of an organic polycarboxylic acid or a functional equivalent thereof such as an anhydride or a lower alkyl ester with an organic polyol and/or an epoxide. The cyclic moieties can be incorporated into the polyester either from the organic polycarboxylic acid component or the organic polyol component or from both. Examples of suitable cyclic polycarboxylic acids or their functional equivalents thereof are phthalic anhydride, tetrahydrophthalic anhydride and hexahydrophthalic anhydride and dimethylcyclohexane dicarboxylate; with the latter two being preferred. Examples of suitable cyclic organic polyols are bisphenol A, hydrogenated bisphenol A, cyclohexanediol and cyclohexanedimethanol.

Besides the cyclic polycarboxylic acids or their functional equivalents thereof, acyclic polycarboxylic acids containing from about 2 to 18 carbon atoms may also be used. Examples include succinic acid, glutaric acid, adipic acid, suberic acid and sebacic acid. Further, mixtures of cyclic polycarboxylic acids with acyclic polycarboxylic acids can be used.

Besides the cyclic polyols mentioned above, acyclic polyols containing from 2 to 12 carbon atoms can be used. Examples include 1,2-butanediol, 1,4-butanediol, neopentyl glycol and 1,6-hexanediol. Also, mixtures of cyclic polyols and acylic polyols can be used.

Preferably, the polyol component will contain neopentyl groups such as the aforementioned neopentyl glycol and 2,2-dimethyl-3-hydroxypropyl 2,2-dimethyl-3-hydroxypropionate. Preferably, the polyester will contain from about 15 to 80, more preferably from about 40 to 70, percent by weight of such branched moieties, the percentage by weight being based on weight of the polyol which contains branching divided by the total weight of ingredients which are used in preparing the polyester polyol. Neopentyl groups are preferred because of better durability in the resultant coating.

The polycarboxylic acid and the polyol used in preparing the polyester are preferably difunctional. Use of higher functionality materials such as tricarboxylic acids or triols, although they can be used, are not preferred because they result in lower flexibility and higher resin viscosities, which are more difficult to process. Examples of polyfunctional materials would be trimellitic anhydride and trimethylolpropane.

Besides the organic polycarboxylic acids and polyols mentioned above, polyester polyols of the invention can be prepared with minor amounts, i.e., less than 30 percent by weight based on total weight of ingredients used in making the polyester of compounds containing both hydroxyl and carboxyl groups. Examples of such materials are dimethylolpropionic acid and 6-hydroxyhexanoic acid.

Also, amines or hydroxyl-containing amines can be used in preparation of the polyester polyols. The resultant polyester would be more accurately defined in this instance as a polyesteramide and polyesteramides are included within the definition of polyester polyols for the purposes of this invention. Examples of suitable polyamines or amino polyols are hexamethylenediamine and monoethanolamine.

In order to achieve the high resin solids contents and sprayabilities, the polyester polyol used in the practice of the invention preferably should have a molecular weight (on a number average basis) of 1000 or less, more preferably about 300 to 800. Using polyesters having molecular weights much higher than 1000 presents difficulties in formulating high solids compositions; whereas molecular weights less than 300 are not preferred because of relatively poor flexibility in the resultant coating.

Besides the polyester polyol described above, the film-forming compositions of the present invention also contain two or more, usually two polyurethane polyols. Both of the polyurethane polyols will have Sward Hardness values determined as described above of less than 10, usually about 2 to 10, preferably 2 to 6. Hardness values greater than 10 are undesirable because of insufficient flexibility in the resultant coating.

The polyurethane polyol is referred to as a plasticizer, however, it is a reactive material in that it, along with the polyester, participates in the curing with the curing agent.

Besides having Sward Hardness values as described above, the difference in the Sward Hardness values between the polyester and each of the polyurethanes should be at least 10, preferably within the range of 10 to 40 inclusive, more preferably 20 to 40 inclusive, to provide the best combination of durability, hardness and flexibility.

One of the polyurethane polyols will be of relatively low molecular weight, having a molecular weight of 8000 or less, preferably within the range of 5000 to 8000. The low molecular weight polyurethane is necessary for formulating high solids coating compositions. Molecular weights greater than 8000 in the low molecular weight polyurethane are undesirable because of difficulty in formulating high solids compositions. Molecular weights less than 5000 are not preferred because of reduced flexibility in the coating.

The second polyurethane polyol will be of relatively high molecular weight, having a molecular weight of 12,000 or more, preferably within the range of 12,000 to 20,000. The high molecular weight polyurethane is necessary for the development of superior low temperature flexibility, for example, $-20°$ F. cold bend. Molecular weights less than 12,000 in the high molecular weight polyurethane are undesirable because of poorer flexibility at low temperature. Molecular weights more than 20,000 are not preferred because of high resin viscosities.

The molecular weights are determined by gel permeation chromatography using a polystyrene standard. Therefore, it is not the actual molecular weight which is measured but an indication of the molecular weight compared to polystyrene. The values which are obtained are commonly referred to as polystyrene numbers. However, for the purposes of this application, they are referred to as molecular weights. Further, the molecular weights are the peak molecular weights as determined by the following method.

In measuring the peak molecular weight using the polystyrene as the standard, a Waters Associates gel permeation chromatograph Model 201 was used. Six $\mu$-Styragel columns were used. Each column has the dimensions of 30 centimeters long and 7.8 millimeters inside diameter. A differential refractometer was used as detector, and the columns were arranged according to their pore size on the order of $10^6$-$10^5$-$10^4$-$10^3$-500-100 Angstroms with the $10^3$ Angstrom column being the first one. Tetrahydrofuran was used as a solvent with a flow rate of 2.0 milliliters/minute. The quality of the columns is checked by their "theoretical plate number" determined from ortho-dichlorobenzene and those columns with theoretical plate numbers greater than 3000/30 cm were used.

To determine molecular weight by gel permeation chromatography (GPC), the instrument is first calibrated using a polystyrene standard. Polystyrene standards used were purchased from Pressure Chemicals Company, Pittsburgh, Pennsylvania, and Waters Associates. The polystyrene standards have dispersities (dispersity=weight average molecular weight/number average molecular weight) ranging from 1.05 to 1.10. The weight average molecular weights of the polystyrene standards used were 900,000; 233,000; 50,000; 17,500; 4,000. To obtain a calibration curve, a set of 0.1 percent (10 milligram polystyrene/1.0 ml tetrahydrofuran) polystyrene solutions in tetrahydrofuran were prepared and a 0.5 ml sample size was injected into the columns and a GPC chromatogram was obtained. The elution volume of each peak corresponding to a given molecular weight of the polystyrene standard was measured and the data was plotted on a semilogarithmic paper (logarithm scale in the ordinate and linear scale in the abscissa). A linear least squares plot of $\log_{10}$ (molecular weight) versus elution volume in milliliters is used as a calibration curve. The lowest molecular weight of the polystyrene standard used was 4000 and the calibration curve beyond that was extrapolated down to 100. The upper and lower exclusion limits of this set of columns are 5,000,000 and 100, respectively, in terms of polystyrene molecular weight. The sample whose molecular weights are to be determined was prepared as a 1.0 percent tetrahydrofuran solution. After filtration through a 0.5 micron filter, available from Gehman Corporation, Catalog No. 4219, a 0.5 ml sample size was injected into the columns and a GPC chromatogram obtained under the same experimental conditions as the calibration. The molecular weight which is reported is the peak molecular weight which is the polystyrene number in the molecular weight distribution cure at the peak. Where there is more than one peak, the highest peak is intended.

The polyurethane polyols are formed by a similar technique, that is, reacting an organic polyisocyanate with a polymeric polyol or with a mixture of a polymeric polyol and optionally a low molecular weight polyol. The low molecular weight polyol, if used, will have a molecular weight less than 250, whereas the polymeric polyol will have a molecular weight greater than 500. To prepare different molecular weight products, the molecular weights and/or amounts of starting materials are adjusted accordingly as is known in the art.

The organic polyisocyanate is reacted with the polyol so that the OH/NCO equivalent ratio is greater than 1:1 so that the resultant product contains free hydroxyl groups. Preferably, the polyurethane polyol will have a hydroxyl value calculated as described above of about 10 to 100, more preferably 30 to 70.

The organic polyisocyanate which is used in preparing the polyurethane polyols can be an aliphatic or an aromatic polyisocyanate or a mixture of the two. Aliphatic polyisocyanates (including cycloaliphatic polyisocyanates) are preferred because of better color stability in the resultant coating. Also, diisocyanates are preferred, although higher polyisocyanates such as triisocyanates can be used. However, their use does result in some chain branching which results in increased viscosity and difficulties in formulating the high solids coatings of the invention.

Examples of suitable diisocyanates are 4,4'-diphenylmethane diisocyanate, 1,4-tetramethylene diisocyanate, isophorone diisocyanate and 4,4'-methylene-bis-(cyclohexyl isocyanate). Examples of suitable higher functionality polyisocyanates are polymethylene polyphenyl isocyanates.

Examples of suitable polyols which can be used with the polyisocyanates are those having a molecular weight greater than 500 and these would include polyester polyols, which are preferred, polyether polyols and mixed polyester-polyether polyols. Examples of suitable polyester polyols are those prepared by reacting an organic polycarboxylic acid or its functional equivalent thereof such as an anhydride or a lower alkyl ester with an organic polyol and/or an epoxide such as described above.

Besides polyester polyols formed from polycarboxylic acids and polyols, polyacetone-type polyesters can also be employed. These products are formed from reaction of a lactone such as epsilon-caprolactone and an active hydrogen-containing material such as a polyol. Such products are described in U.S. Pat. No. 3,169,945 to Hostettler, and the portion of this patent relating to the description of polycaprolactone polyols being incorporated by reference. While not disclosed in the aforementioned patent, the reaction product of a lactone with an acid-containing polyol such as described in U.S. Pat. No. 4,098,743 can also be used. Typically, the polyesters used will have a hydroxyl value of 50 to 250.

Besides the polyester polyols, polyether polyols can also be employed. Examples of polyether polyols are polyalkylene ether polyols which include those having the structural formula:

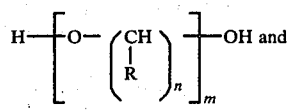

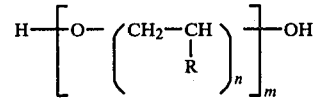

where the substituent R is hydrogen or lower alkyl containing from 1 to 5 carbon atoms including mixed substituents and n is typically from 2 to 6, and m is from 10 to 1000. Included are poly(oxytetramethylene) glycols, poly(oxyethylene) glycols, poly(oxy-1,2-propylene) glycols and the reaction product of ethylene glycol with a mixture of 1,2-propylene oxide and ethylene oxide.

Also useful are polyether polyols formed from oxyalkylation of various polyols, for example, glycols such as ethylene glycol, 1,6-hexanediol, bisphenol A and the like, or other higher polyols such as trimethylolpropane, pentaerythritol and the like. If these higher functionality polyols are used, however, they should be used in minor amounts so as to minimize chain branching and the resultant high viscosities which are obtained.

The polyol component described above is mixed with curing agent which is capable of reacting with the active hydrogen in the polyester and polyurethane polyol to give a thermoset coating. Examples of curing agents are aminoplasts, which are preferred, and polyisocyanate curing agents such as blocked isocyanates. These three ingredients, i.e., polyester polyol, polyurethane polyol and curing agent, provide the major resinous components of the coating compositions of the invention.

Aminoplast condensates are obtained from the reaction of formaldehyde with an amine or an amide. The most common amines or amides are melamine, urea or benzoguanamine, and are preferred. However, condensates with other amines and amides can be employed, for example, aldehyde condensates or diazines, triazoles, guanidines, guanamines and alkyl and aryl di-substituted derivatives of such compounds including alkyl and aryl-substituted ureas and alkyl and aryl-substituted melamines and benzoguanines. Some examples of such compounds are N,N-dimethylurea, N-phenylurea, dicyandiamide, formoguanamine, acetoguanamine, 6-methyl-2,4-diamino-1,3,5-triazine, 3,5-diaminotriazole, triaminopyrimidine, 2,6-triethyltriamine-1,3,5-triazine and the like.

While the aldehyde employed is most often formaldehyde, other aldehydes such as acetaldehyde, crotonaldehyde, benzaldehyde and furfuryl may be used.

The aminoplast contains methylol or similar alkylol groups and preferably at least a portion of these alkylol groups are etherified by reaction with an alcohol to provide organic solvent-soluble resins. Any monohydric alcohol can be employed for this purpose including such alcohols as methanol, ethanol, butanol and hexanol.

Preferably, the aminoplasts which are used are melamine-, urea- or benzoguanamine-formaldehyde condensates etherified with an alcohol containing 1 to 4 carbon atoms such as methanol, ethanol, butanol or mixtures thereof.

Polyisocyanates and blocked polyisocyanates may also be used as curing agents. Examples of suitable polyisocyanates include monomeric polyisocyanates such as toluene diisocyanate and 4,4'-methylene-bis-(cyclohexyl isocyanate), isophorone diisocyanate and NCO-prepolymers such as the reaction products of monomeric polyisocyanate such as those mentioned above with polyester or polyether polyols. Particularly useful isocyanates are the isocyanurate from isophorone isocyanate commercially available from Veba Company as T1890 and the biuret from 1,6-hexamethylene diisocyanate commercially available from Bayer as DESMODUR N. The polyisocyanate may optionally be blocked. Examples of suitable blocking agents are those materials which would unblock at elevated temperatures such as low aliphatic alcohols such as methanol, oximes such as methyl ethyl ketone oxime, and lactams such as caprolactam. Blocked isocyanates can be used to form stable one-package systems. Polyfunctional isocyanates with free isocyanate groups can be used to form two-package room temperature curable systems. In these systems, the polyester and isocyanate curing agent are mixed just prior to their application.

The amounts of polyester polyol, polyurethane polyols and curing agent which are used in the practice of the invention are preferably adjusted so that the ratio of polyester polyol plus polyurethane polyols: curing agent is within the range of 5 to 0.5:1, preferably 2 to 1:1. Preferably, the weight ratio of polyester polyol plus curing agent:polyurethane polyols is within the range of 100 to 1:1, preferably 9 to 1:1. Ratios of polyester polyol plus polyurethane polyols:curing agent greater than 5:1 are not preferred because hardness and durability of the resultant coating will suffer; whereas ratios less than 1:1 are not preferred because flexibility of the resultant coating will suffer. Ratios of polyester polyol plus curing agent:polyurethane polyols greater than 100:1 are not preferred because of relatively poor flexibility in the resultant coating; whereas ratios less than 1:1 are not preferred because the resultant coatings are relatively soft and lack toughness. The ratio of low molecular weight polyurethane polyol to high molecular weight polyurethane polyol should be about 4 to 0.5:1, preferably 3 to 1:1 on a weight basis. Ratios greater than 4:1 are undesirable because of poor low temperature flexibility; whereas ratios less than 0.5:1 are undesirable because compositions are difficult to formulate at high solids contents.

The above-described resinous components can be formulated into clear coating compositions or, alternately, they can be formulated with pigments to form paints. The pigments may be any of the conventional types comprising, for example, iron oxides, lead oxides, strontium chromate, carbon black, coal dust, titanium dioxide, talc, barium sulfate, as well as color pigments such as cadmium yellow, cadmium red, chromium yellow, and metallic pigments such as aluminum flake.

The pigment content of the paint is usually expressed as the pigment-to-resin weight ratio. In the practice of the invention, when the film-forming coating compositions of the present invention contain pigment, the pigment-to-resin weight ratios may be as high as 2:1 and for most pigmented coatings, are within the range of 0.05 to 1:1.

Although the coating compositions of the present invention are of the high solids type, a liquid diluent is usually present in the composition. By liquid diluent is meant a solvent or non-solvent which is volatile and is removed after the coating is applied and is needed to reduce viscosity sufficiently to enable forces available in simple coating techniques, namely, spraying, to spread the coating to controllable, desired and uniform thicknesses. Also, diluents assist in substrate wetting, resinous component compatibility, package stability and coalescence or film formation. Examples of suitable diluents include aromatic hydrocarbons such as toluene and xylene, ketones such as methyl ethyl ketone and methyl isobutyl ketone, alcohols such as isopropyl alcohol, normal-butyl alcohol, monoethers of glycols such as the monoethers of ethylene glycol and diethylene glycol, as well as compatible mixtures thereof. The diluent is usually present in amounts up to 65 percent by weight, usually 40 to 63 percent by weight based on total weight of diluent and resin solids.

In addition to the above ingredients, various fillers, plasticizers, anti-oxidants, U.V. light absorbers, flow control agents, surfactants and other formulating additives can be employed if desired. These materials are optional and generally constitute up to 5 percent by weight, based on total solids in the coating formulation.

For coating compositions, the use of polymeric microparticles such as described in U.S. Pat. No. 4,147,688 is preferred for sag control and metallic pigment pattern control. The polymeric microparticles help to align metallic pigments such that they give the coating a lustrous appearance.

The coating compositions of the present invention are designed for application by spraying, although other conventional methods of coating including brushing, dipping and flow coating can be employed if desired. However, as mentioned above, they are especially formulated for spraying. Usual spray techniques and equipment are utilized. Coatings of the present invention can be applied virtually over any substrate including wood, metal, glass, cloth, plastics, foams and the like, as well as over various primers. The coatings are particularly useful on resilient and rubbery substrates such as foam rubber, polyurethane foam and vinyl foam, and on soft metal surfaces such as mild steel and aluminum.

The combination of outstanding properties of the coating compositions of the present invention make them useful for a wide variety of applications. They can be used for coating automotive parts such as automobile bodies and truck cabs. Also, they can be used for other coating applications such as coatings for appliance parts such as refrigerators and washing machines, and they can also be used for coil coating applications.

In general, casting thickness will vary depending upon the application desired. In general, coatings from about 0.1 to 5 mils have been found to be useful in most applications.

After application to the substrate, the coatings are cured. Curing is usually conducted at temperatures of about 100° to 200° C., and in most cases, a cure schedule is from about 20 to 30 minutes at about 120° to 150° C. Higher or lower temperatures with correspondingly shorter or longer times can be utilized, although the exact cure schedule best employed depends upon the nature of the substrate as well as the particular components used in formulating the coating compositions. With aminoplast curing agent, acid catalysts can be employed, if desired, as they usually permit use of lower temperatures and shorter times for cure.

The following examples illustrate the invention. All quantities are on a weight basis unless otherwise indicated.

EXAMPLE A

A polyester (Sward Hardness value=34, containing 42.5 percent cyclic moieties and MW=344) was prepared from the following mixture of ingredients:

| Ingredients | Parts by Weight (in grams) |
|---|---|
| Neopentyl glycol | 2255.8 |
| Hexahydrophthalic anhydride | 1744 |
| Butyl stannoic acid | 0.2 |
| Methyl amyl ketone | 435 |

The ingredients were charged to a reaction vessel and heated to reflux. Reaction was continued with water being removed until an acid value of about 7.3 was obtained. The reaction mixture was thinned with the methyl amyl ketone. The polyester resin had a theoretical solids content of 90 percent, an OH value of 321 (at 100 percent resin solids) and an acid value of 8.27.

EXAMPLE B

A poly(ester-urethane) polyol (Sward Hardness value=2 and MW=19,000) was prepared from the following mixture of ingredients:

| Ingredients | Parts by Weight (in grams) |
|---|---|
| Polycaprolactone polyol (MW = 1250) | 39.26 |
| Dimethylolpropionic acid | 1.19 |
| DESMODUR-W[1] | 9.56 |
| Methyl isobutyl ketone | 18.29 |
| Methyl ethyl ketone | 31.46 |

-continued

| Ingredients | Parts by Weight (in grams) |
|---|---|
| Monoethanolamine | 0.23 |

[1]4,4'-methylene-bis-(cyclohexyl isocyanate) obtained from Mobay Company.

The methyl isobutyl ketone, PCP-0230, dimethylolpropionic acid and HYLENE W were charged to a reaction vessel under a nitrogen atmosphere and heated to 110° C. until a Gardner-Holdt bubble viscosity of 12.9 seconds was reached. The viscosity was measured by taking a sample of the resin and thinning with 46 parts of methyl ethyl ketone per 100 parts of resin. After the required viscosity was obtained, the monoethanolamine was then added, followed by the addition of the methyl ethyl ketone. The reaction product had a resin solids content (150° C.) of about 49.8 percent, a Gardner-Holdt letter viscosity of B+, an acid value of 9.8 based on resin solids and a hydroxyl number of 18.8 (37.6 at 100 percent resin solids).

EXAMPLE C

A poly(ester-urethane) polyol (Sward Hardness value=4 and MW=6336) was prepared by charging the following mixture of ingredients to a reactor and heating to 120° C. until infrared spectra showed little or no evidence of epsilon-caprolactone:

| Ingredients | Parts by Weight (in grams) |
|---|---|
| Dimethylolpropionic acid | 33.2 |
| Diethylene glycol | 397.6 |
| Epsilon-caprolactone | 2889.2 |

The reaction mixture was cooled to 60° C. and 2650 grams poured into another reactor. Isophorone diisocyanate (555 grams) was added and the mixture thinned to 90 percent resin solids with methyl isobutyl ketone. The reaction mixture was heated to exotherm and held at 110° C. for 3 hours. An IR spectrum showed no evidence of isocyanate groups. The resin had a resin solids content (150° C.) of 86.9 percent, a Gardner-Holdt bubble viscosity of 23.9 seconds, an acid value of 6.4, a hydroxyl number of 59.6 (66.2 at 100 percent resin solids). The resin was further thinned to 70 percent solids in 2-ethoxyethylacetate for use in Examples I and II.

EXAMPLES I AND II

The following examples are of thermosetting elastomeric film-forming compositions of the present invention which were prepared with the polyester polyol and polyurethane polyols of Examples A-C.

EXAMPLE I

A paint was prepared from the following mixture of ingredients:

| Ingredients | Parts by Weight (in grams) | |
|---|---|---|
| Pigment Paste (I)[1] | 342.41 | |
| Inhibitor mixture[2] | 218.17 | |
| Polymeric microparticles[3] | 58.18 | |
| Polyester of Example A | 34.71 | (90% solids) |
| CYMEL 1130[4] | 128.02 | |
| Polyurethane of Example C | 91.44 | |
| Polyurethane of Example B | 64.00 | |

-continued

| Ingredients | Parts by Weight (in grams) |
|---|---|
| Para-toluenesulfonic acid | 3.21 |
| Catalyst[5] | 3.21 |
| Dodecyl benzenesulfonic acid | 3.21 |

[1]Pigment Paste (I) was prepared by grinding $TiO_2$ and polyethylene powder in an iminized polyester grinding vehicle.
[2]Solution of 3.21 parts of cellulose acetate butyrate, 640 parts of TINUVIN 328 (substituted benzotriazole, ultraviolet light absorber, commercially available from Ciba-Geigy), 0.94 parts of silicone fluid in a solvent mixture of 38.41 parts of n-propanol, 22.40 parts of VM & P Naphtha, 28.52 parts of 2-butoxyethylacetate and 118.29 parts of methyl amyl ketone.
[3]Prepared in accordance with Example II of U.S. Pat. No. 4,147,688 and diluted on a 1:1 volume basis with 2-hexoxyethanol.
[4]Mixed methylated, butylated, melamine-formaldehyde resin commercially available from American Cyanamid Company.
[5]Dinonylnaphthalenedisulfonic acid, 50 percent neutralized with diisopropylamine used as a 30 percent by weight solution in a mixture of 52.6 percent (by volume) isopropyl alcohol, 8.2 percent water and 39.2 percent isobutanol.

The paint prepared from the above-described mixture of ingredients had a sprayable resin solids content of about 52 percent by weight. The weight ratio of polyester polyol plus polyurethane polyols:aminoplast was about 1:1, and the weight ratio of polyester polyol plus aminoplast:polyurethane polyols was about 1.66:1. The weight ratio of the higher molecular weight polyurethane polyol (Example B) to lower molecular weight polyurethane polyol (Example C) was 0.5:1. The paints were sprayed onto a ⅛ inch thick RIM thermoplastic polyurethane commercially available from Mobay Chemical Company as TEXIN 3202. The coating was cured at 124° C. for 30 minutes to give a 1.8 mil thick cured coating. Free films of the resinous ingredients of this example had tensile strengths of 2500 psi and elongations of 45 percent. The cured coating had a Sward hardness of 16 and withstood a −20° F. cold bend without cracking. The coating exhibited no blistering nor loss of gloss after being subjected to humidity testing for 240 hours in a QCT chamber as described above.

EXAMPLE II

A paint was prepared from the following mixture of ingredients:

| Ingredients | Parts by Weight (in grams) |
|---|---|
| Inhibitor mixture[1] | 181.58 |
| Polymeric microparticles as described in Example I | 130.11 |
| Polyester of Example A | 93.94 |
| CYMEL 1130 | 162.33 |
| Polyurethane of Example C | 115.97 |
| Polyurethane of Example B | 40.59 |
| Para-toluenesulfonic acid | 3.65 |
| Catalyst of Example I | 3.24 |

[1]Solution of 4.05 parts of cellulose acetate butyrate, 8.12 parts of TINUVIN 328 (substituted benzotriazole, ultraviolet light absorber, commercially available from Ciba-Geigy), 1.02 parts of silicone fluid in a solvent mixture of 48.70 parts of n-propanol, 28.80 parts of VM&P Naphtha, 18.18 parts of isobutylacetate and 72.71 parts of 2-ethoxyethylacetate.

The paint prepared from the above-described mixture of ingredients had a sprayable resin solids content of about 55 percent by weight. The weight ratio of polyester polyol plus polyurethane polyols:aminoplast was 1.15:1; the weight ratio of polyester polyol plus aminoplast:polyurethane polyols was 2.43:1; and the weight ratio of the high molecular weight polyurethane polyol (Example B) to low molecular weight polyurethane polyol (Example C) was 0.5:1.

The paints were sprayed onto a ⅛ inch thick RIM thermoplastic polyurethane commercially available from Mobay as TEXIN 3202. The coating was cured at 124° C. for 30 minutes to give a 1.8 mil thick cured coating. Free films of the resinous ingredients of this example have tensile strengths of 1846 psi and elongations of 45 percent. The cured coating had a Sward hardness of 16 and withstood a −20° F. cold bend as described above without cracking. The coating exhibited no blistering nor loss of gloss after being subjected to humidity testing for 240 hours in a QCT chamber as described above.

We claim:

1. A thermosetting, liquid, elastomeric, film-forming composition sprayable at a resin solids content of at least 35 percent by weight and being flexible such that when the coating composition is deposited on an elastomeric substrate and cured, the coated elastomeric substrate can be bent around a ¼-inch mandrel with the coating facing outwardly and the coating exhibits no breaks or cracks when tested at 0° F., comprising as the film-forming constituents:
   (A) a polyester polyol having at least 20 percent by weight cyclic moieties and the percentage of cyclic moieties being not greater than than required to achieve said flexibility, having a hydroxyl value of at least 80 and the hydroxyl content being not greater than that required to achieve said flexibility, having a molecular weight of 300 or greater but not greater than that required for formulating said coating composition with a sprayability of at least 35 percent by weight, and a Sward Hardness value of at least 15,
   (B) a polyurethane polyol having a molecular weight of 8000 or less but not less than that required to achieve said flexibility and a Sward Hardness value of less than 10,
   (C) a polyurethane polyol having a molecular weight of at least 12,000 but not greater than that required for formulating said coating composition with a sprayability of at least 35 percent by weight, and a Sward Hardness value of less than 10, and
   (D) a curing agent capable of reacting with the active hydrogens in (A), (B) and (C) to form a crosslinked coating selected from the class consisting of aminoplast and polyisocyanates;
   the difference in Sward Hardness values between (A) and (B) and (A) and (C) each being greater than 10; the weight ratio of (A)+(B)+(C):(D) is within the range of 5 to 0.5:1; the weight ratio of (A)+(D):(B)+(C) is within the range of 100 to 1:1 and the weight ratio of (B):(C) is within the range of 4 to 0.5:1.

2. A thermosetting, liquid, elastomeric, film-forming compositions sprayable at a resin solids content of at least 35 percent by weight and being flexible such that when the coating composition is deposited on an elastomeric substrate and cured, the coated elastomeric substrate can be bent around a ¼-inch mandrel with the coating facing outwardly and the coating exhibits no breaks or cracks when tested at 0° F., comprising as the film-forming constituents:
   (A) a polyester polyol having 20 to 70 percent by weight cyclic moieties, 15 to 80 percent by weight neopentyl moieties, said polyester having a hydroxyl value of 120 to 350, having a molecular weight of 300 or greater but less than 1000 and a Sward Hardness value of 20 to 40, (B) a polyurethane polyol having a molecular weight of 5000 to 8000 and a Sward Hardness value of less than 10, (C) a polyurethane polyol having a molecular weight of 12,000 to 20,000 and a Sward Hardness value of less than 10, and (D) a curing agent capable of reacting with the active hydrogens in (A), (B) and (C) to form a cross-linked coating selected from the class consisting of aminoplast and polyisocyanates;

the difference in Sward Hardness values between (A) and (B) and (A) and (C) each being within the range of 20 to 40 inclusive; the weight ratio of (A)+(B)+(C):(D) is within the range of 2 to1:1; the weight ratio of (A)+(D):(B)+(C) is within the range of 9 to 1:1 and the weight ratio of (B):(C) is within the range of 3 to 1:1.

3. The coating composition of claim 1 or 2 comprising from 20 to 70 percent by weight cycloaliphatic moieties.

4. The coating composition of claim 1 in which the polyester contains neopentyl groups.

5. The coating composition of claim 1 or 2 in which the polyester polyol is formed from reacting a cycloaliphatic dicarboxylic acid or its functional equivalent thereof with a polyol containing neopentyl groups.

6. The coating composition of claim 5 in which the cycloaliphatic dicarboxylic acid is selected from the class consisting of hexahydrophthalic acid and dimethylcyclohexane dicarboxylic acid or their functional equivalents thereof.

7. The coating composition of claim 5 in which the polyol containing neopentyl group branching is selected from the class consisting of 2,2-dimethyl-3-hydroxypropyl, 2,2-dimethyl-3-hydroxypropionate and neopentyl glycol.

8. The coating composition of claim 1 in which the polyester polyol has a molecular weight of 1000 or less.

9. The coating composition of claim 1 or 2 in which the curing agent is a melamine-, urea- or benzoguanamine-formaldehyde condensate etherified with an alcohol containing 1 to 4 carbon atoms including mixtures thereof.

10. The coating composition of claim 1 or 2 in which the polyurethane polyols are polyester-polyurethane polyols.

11. The coating composition of claim 1 or 2 in which the curing agent is a blocked isocyanate.

* * * * *